(12) United States Patent
Lee

(10) Patent No.: US 6,203,094 B1
(45) Date of Patent: Mar. 20, 2001

(54) TAILGATE OF CAR

(75) Inventor: Jin-Lyoul Lee, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/443,582

(22) Filed: Nov. 18, 1999

(30) Foreign Application Priority Data

May 1, 1999 (KR) .................................................. 99-15782
May 1, 1999 (KR) .................................................. 99-15783

(51) Int. Cl.$^7$ .................................. B60J 1/14; B60J 1/18; B60J 5/10; B62D 33/027
(52) U.S. Cl. .......................... 296/106; 296/56; 296/146.2; 296/146.3; 296/146.8
(58) Field of Search .......................... 296/201, 56, 146.8, 296/146.2, 146.3, 88, 92, 106, 102

(56) References Cited

U.S. PATENT DOCUMENTS

| | | | |
|---|---|---|---|
| 4,261,612 | * 4/1981 | Chrysler et al. | 296/146 |
| 4,305,614 | * 12/1981 | Holka et al. | 296/37.14 |
| 4,353,111 | * 10/1982 | Gallitzendorfer et al. | 362/80 |
| 4,413,854 | * 11/1983 | Hirshberg | 296/146 |
| 4,433,866 | * 2/1984 | Hagiwara | 296/76 |
| 4,664,437 | * 5/1987 | Queveau | 296/146 |
| 5,570,923 | * 11/1996 | Taylor | 296/164 |

* cited by examiner

Primary Examiner—D. Glenn Dayoan
Assistant Examiner—Greg Blankenship
(74) Attorney, Agent, or Firm—Christie, Parker & Hale, LLP

(57) ABSTRACT

A tailgate of a car, the car for being sequentially mounted by a tailgate inner panel and a tailgate out panel to a tailgate thereof, which the tailgate outer panel is hinged to a tailgate which is vertically openable and closeable, wherein the tailgate comprises a glass plate, a first mounting bracket (or a first mounting pivot) coupled to the tailgate outer panel and a second mounting bracket (or a second mounting pivot) coupled to the glass plate, where the first mounting bracket (or the first mounting pivot) and the second mounting bracket (or the second mounting pivot) are hinged together, such that the tailgate is simple in structure thereof, parts involved are reduced and assembly is easy with manufacturing cost decreased and a beautiful exterior look.

3 Claims, 8 Drawing Sheets

TAILGATE OF CAR

BACKGROUND OF THE INVENTION

1. Field of the Invention

The present invention relates to a tailgate of a car, and more particularly to a tailgate of a car which can be opened up and closed down.

2. Description of the Prior Art

Generally, a tailgate assembly 19, a bumper 1, and a lamp 3 may be mounted at the rear end of a van-type vehicle. Typically, the tailgate assembly 19 is piviotably openable and closeable about a hinge point as is illustrated in FIG. 2.

As illustrated in FIG. 2, a body panel 11 is coupled to a tailgate inner panel 13, which is again coupled at an upper side thereof to a tailgate outer panel 15. The tailgate outer panel 15 is combined at an upper exterior side thereof with a lid 17 and is coupled at a rear exterior side thereof to a tailgate 19.

The tailgate outer panel 15 is coupled at a tip end thereof to a seal member 21 for sealing when the tailgate 19 is closed. The tailgate 19 is combined at a middle section thereof with a hinge bracket 23 and a hinge axle 25 for hinging the tailgate 19. The tailgate 19 is mounted with a support plate 27 arranged at the lid 17 and a glass plate 29 coupled via bolts to the support plate 27. The glass plate 29 adheres at an upper inner surface thereof to the seal member 21 when closed.

When lifting glass plate 29, the tailgate is lifted along an imaginary line indicated in FIG. 2 about the hinge axle 25 coupled to the hinge bracket.

However, there is a problem in the tailgate of the conventional van-type vehicle thus constructed in that the support plate 27 is mounted with the hinge bracket 23 while hinge bracket 23 is coupled to the hinge axle, such that structure thereof is complicated, and many parts are involved therein to make it difficult to assemble and the overall outlook uncomely.

SUMMARY OF THE INVENTION

The present invention is disclosed to solve the aforementioned problems and it is an object of the present invention to provide a tailgate of a car constructed and arranged to directly hinge a tailgate to a tailgate outer panel.

In accordance with the object of the present invention, there is provided a tailgate of a car, the car for being sequentially mounted with a tailgate inner panel and a tailgate outer panel to a tailgate thereof, while the tailgate outer panel is hinged to a tailgate which is vertically openable and closeable, wherein the tailgate comprises a glass plate, the glass plate being directly coupled at an upper end thereof to the tailgate outer panel by hinge means.

The hinge means comprises a first mounting bracket coupled to the tailgate outer panel, a second mounting bracket coupled to the glass plate, and a hinge axle for hinging the first and second mounting bracket, where the second mounting bracket is fixed to the glass plate via a packing member and a tip end of the second mounting bracket protruded outside of the glass plate is coupled to a cap-type nut.

The hinge means further comprises a first mounting pivot having a ball and coupled to the tailgate outer panel, and a second mounting pivot having a journal surface-contacting the ball, where the second mounting pivot is fixed to the glass plate via a packing member, and a tip end of the second mounting pivot protruded outside of the glass plate is coupled to a cap-type nut.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiments of the present invention will now be described in detail with reference to the accompanying drawings.

Figure 3:
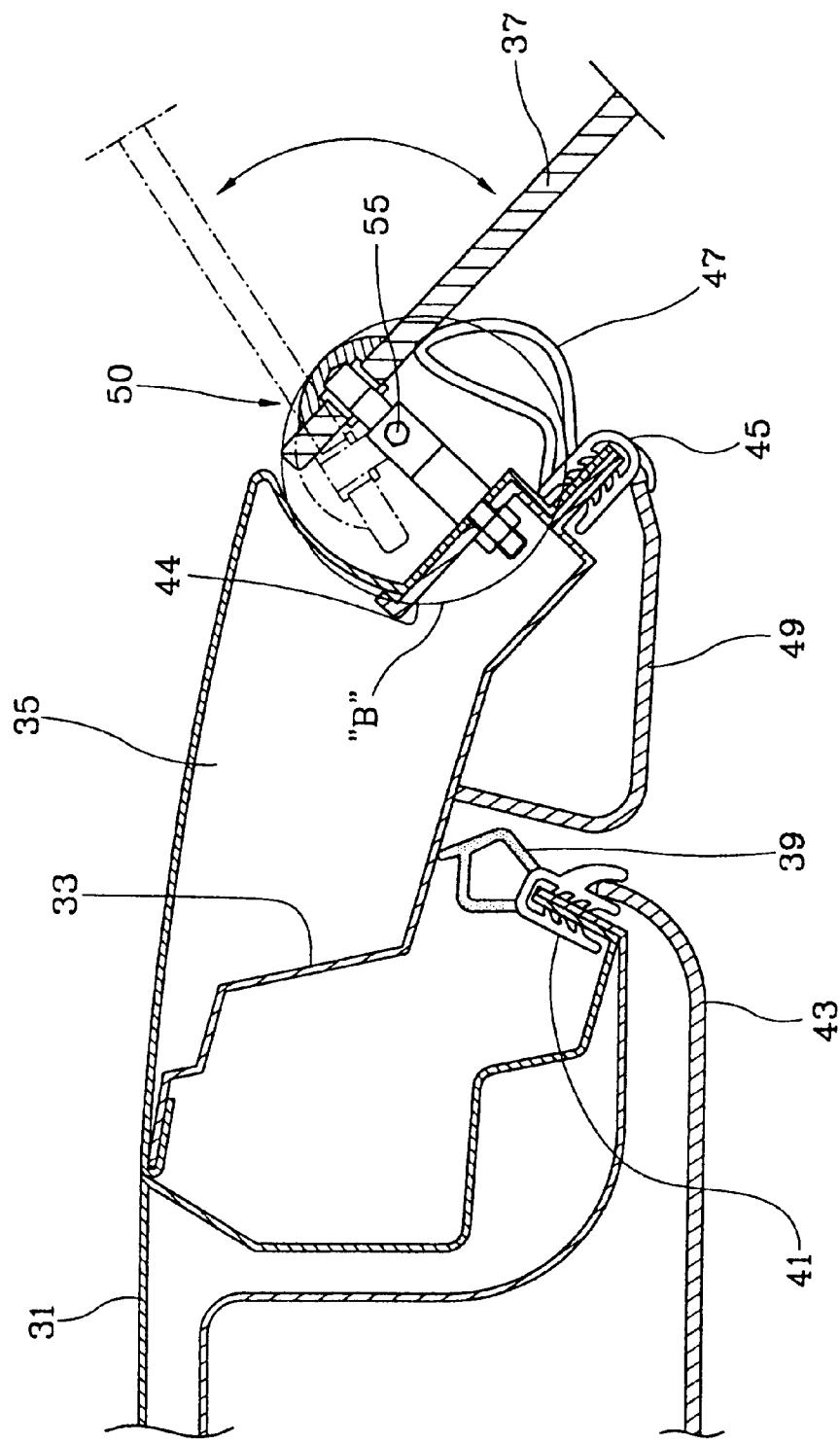
FIG. 3 is a schematic sectional view for illustrating a tailgate portion of a vehicle according to a first embodiment of the present invention.
Figure 4:
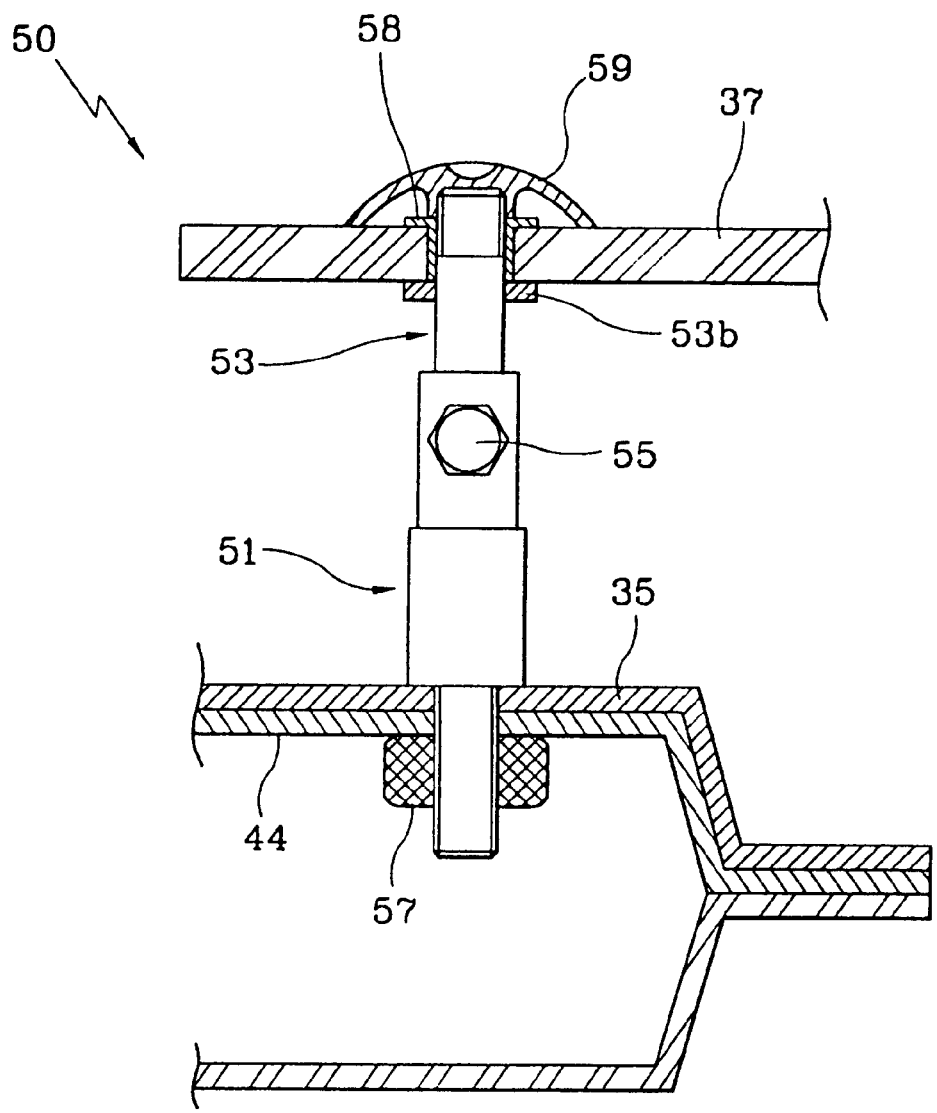
FIG. 4 is a detailed view of "B" part in FIG. 3.
Figure 5:
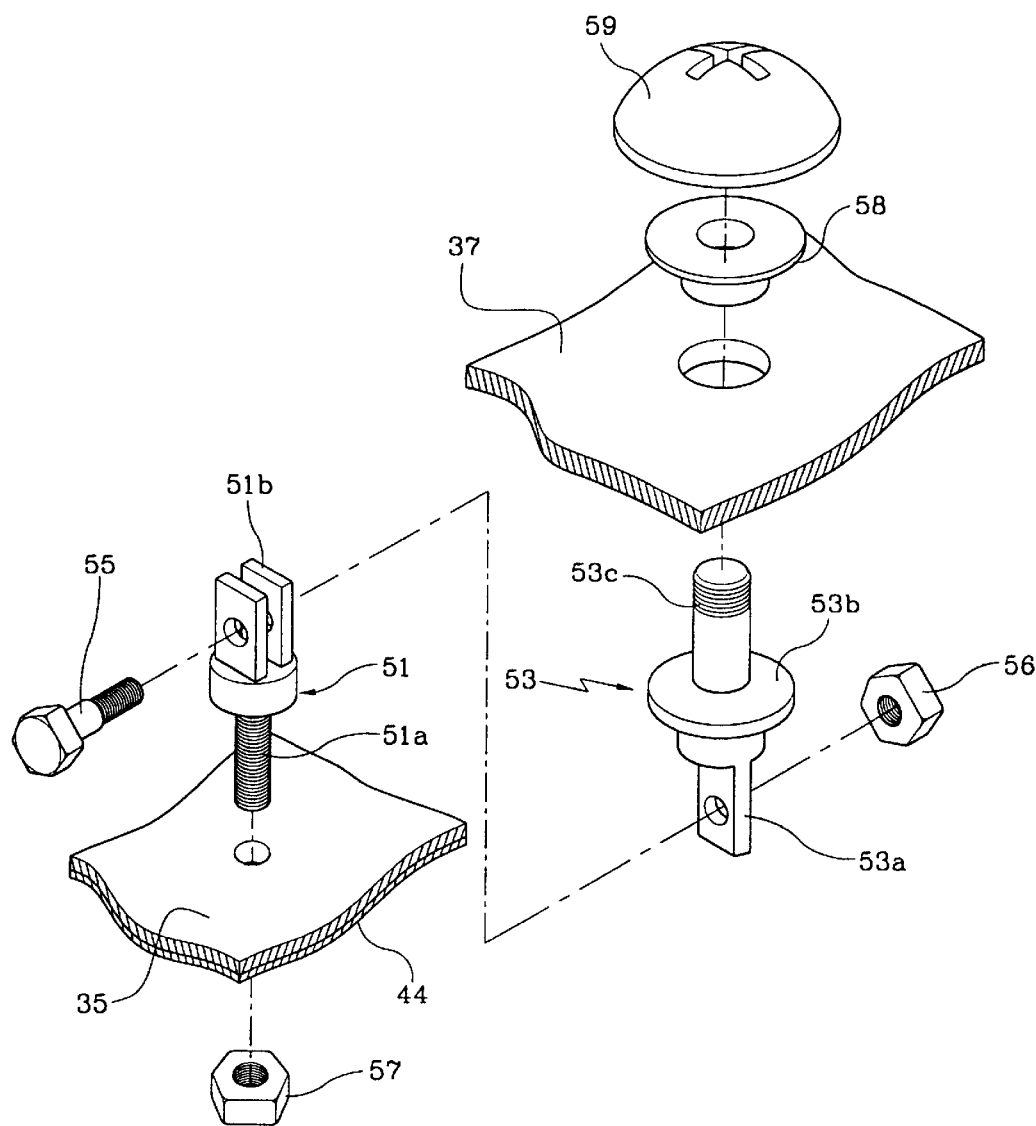
FIG. 5 is an exploded perspective view of FIG. 4.

FIGS. 3, 4 and 5 represent a tailgate of a vehicle according to the first embodiment of the present invention.

As illustrated in FIG. 3, a body panel 31 comprising a body is coupled with a tailgate inner panel 33 and the tailgate inner panel 33 is coupled thereon to a tailgate outer panel 35. The tailgate outer panel 35 is coupled at an exterior rear side thereof to a tailgate mounted with a glass plate 37.

The body panel 31 is provided at a tip end thereof with a seal member 39 which is in turn fixed by a strip band 41 in order to seal a gap between the body panel 31 and the tailgate inner panel 33. The strip band 41 is arranged with a hitching jaw to thereby restrain a body panel trim 43.

A lower tip end between the tailgate inner panel 33 and the tailgate outer panel 35 is closedly adhered by a strip band 45 with a gasket provided therebetween. The strip band 45 serves to fix a seal member 47 for sealing a gap thereof when the tailgate is closed. The strip band 45 is also equipped with a hitching jaw to restrain a tailgate inner panel trim 49.

The tailgate outer panel 35 is bent at a right side thereof towards the tailgate inner panel 33 to form a bent space which is in turn coupled to hinge means 50 for hinging the glass plate 37. The glass plate 37 is hinged at an upper end thereof to the tailgate outer panel 35 by the hinge means 50. The hinge means 50 includes, as illustrated in FIGS. 4 and 5, a first mounting bracket 51 screwed to an upper surface of the bent space at the tailgate outer panel, a second mounting bracket 53 screwed to an upper side of the glass plate and a hinge axle 55 for hinging the first and second mounting brackets 51 and 53.

The tailgate outer panel 35 is formed with a hole into which a lower end of the first mounting bracket 51 is inserted. The glass plate 37 is also formed thereon with a hole into which a tip end of the second mounting bracket 53 is inserted.

The first mounting bracket 51 is formed thereunder with a screw unit 51a and is formed thereon with a female head unit 51b formed with a reentrant unit through which a lower end of the second mounting bracket 53 is inserted. The female head unit 51b is horizontally formed with a hole through which the hinge axle 55 is inserted. The screw unit 51a at the first mounting bracket 51 is inserted into a hole of the tailgate outer panel 35 to thereafter be fixed by a nut 57.

At this time, the tailgate outer panel is extended therein with the gasket 44, and coupled by a nut 57.

The second mounting bracket 53 is formed thereunder with a male head unit 53a for insertion into a reentrant unit of the female head unit 51b, and the male head unit 53 is horizontally formed with a hole through which the hinge axle 55 is inserted.

The second mounting bracket 53 is formed thereon with a flange 53b for hitching the glass plate 37 and a screw unit 53c.

The screw unit 53c of the second mounting bracket 53 is inserted into a hole at the glass plate 37. The hole is again inserted by a bush-type packing member 58 for protection of the glass and by a cap-type nut 59 to secure the second mounting bracket 53.

The hinge axle 55 of bolt shape is inserted into a hole horizontally formed at the first and second mounting brackets 53 and 55, and combined by a nut 56 to prevent the hinge axle 55 from slipping therefrom.

The hinge means 50 is assembled by inserting the first mounting bracket 51 into the tailgate outer panel 35, the second mounting bracket 53 into the glass plate, fixing the same and inserting the same into the hinge axle 55.

Figure 1:
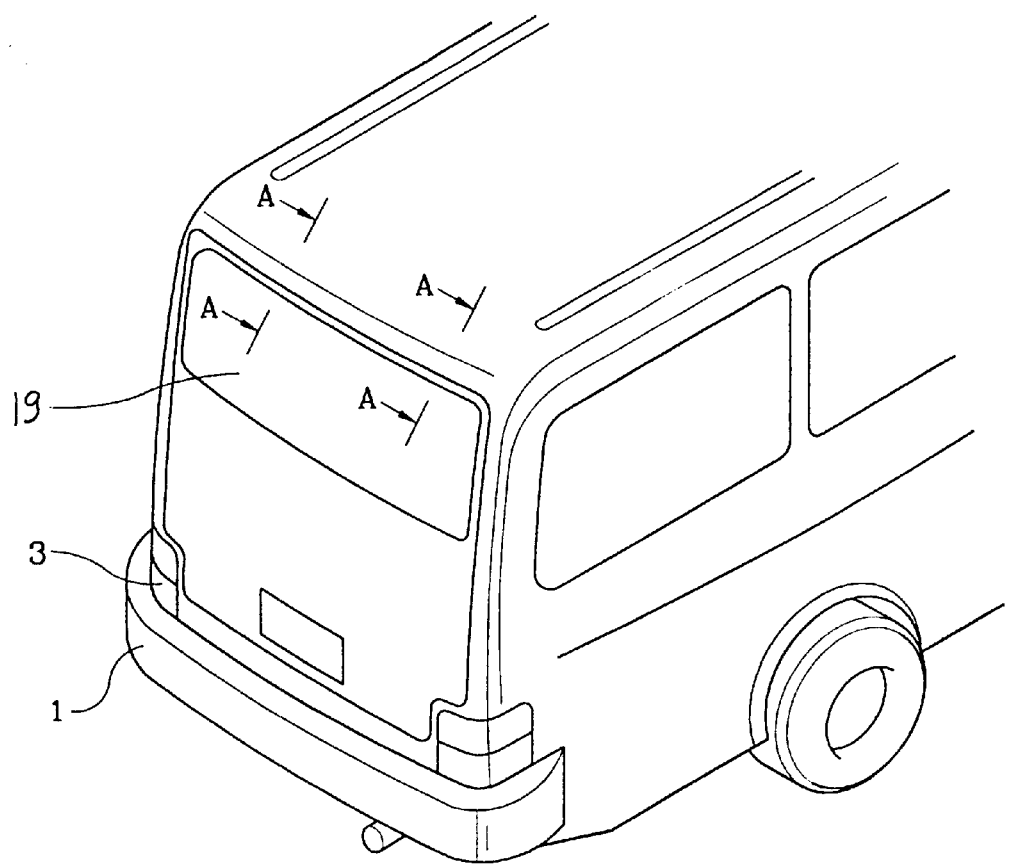
FIG. 1 is a partial perspective view for illustrating a rear side of a vehicle.
Figure 2:
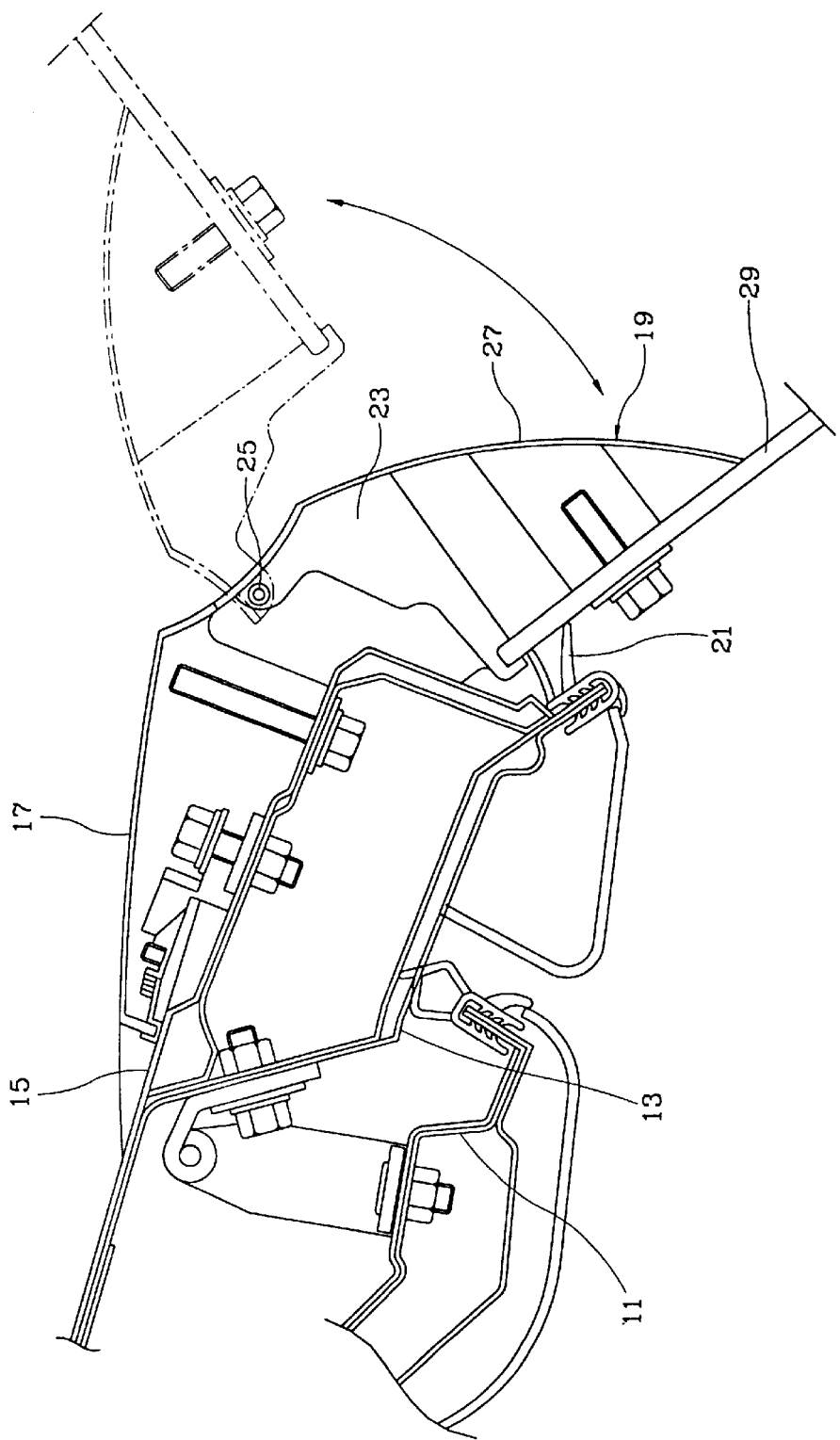
FIG. 2 is a schematic sectional view for illustrating a tailgate portion of the conventional vehicle (a sectional view taken along line A—A in FIG. 1)

The hinge means 50 is provided at two places of the tailgate breadth wise of the vehicle as shown in FIG. 1 (indicated by an arrow).

In the tailgate thus constructed, when the glass plate 37 is lifted, the tailgate is lifted about the hinge axle 55 as indicated by an imaginary line in FIG. 3.

Figure 6:
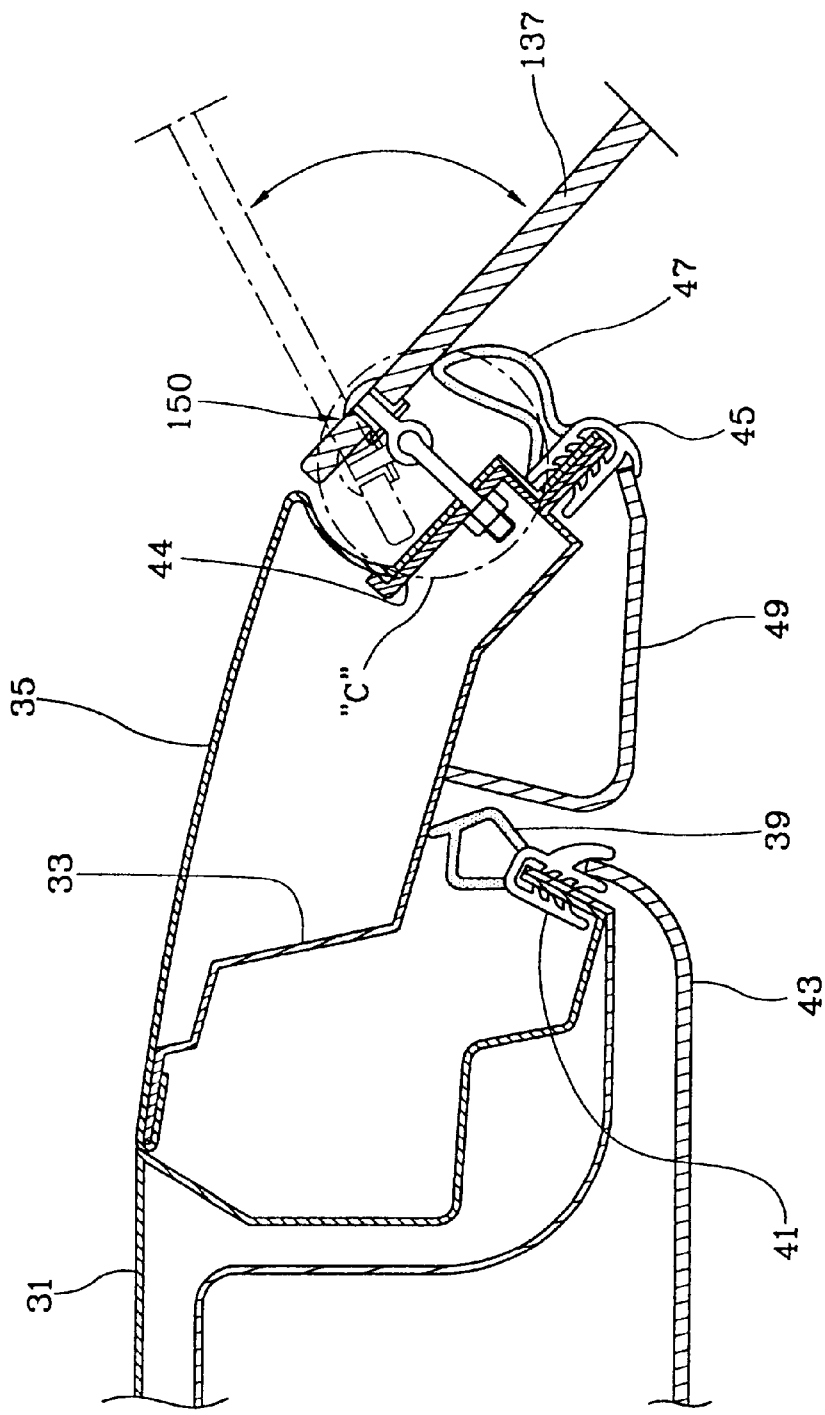
FIG. 6 is a schematic sectional view for illustrating a tailgate portion of a vehicle according to a second embodiment of the present invention.
Figure 7:
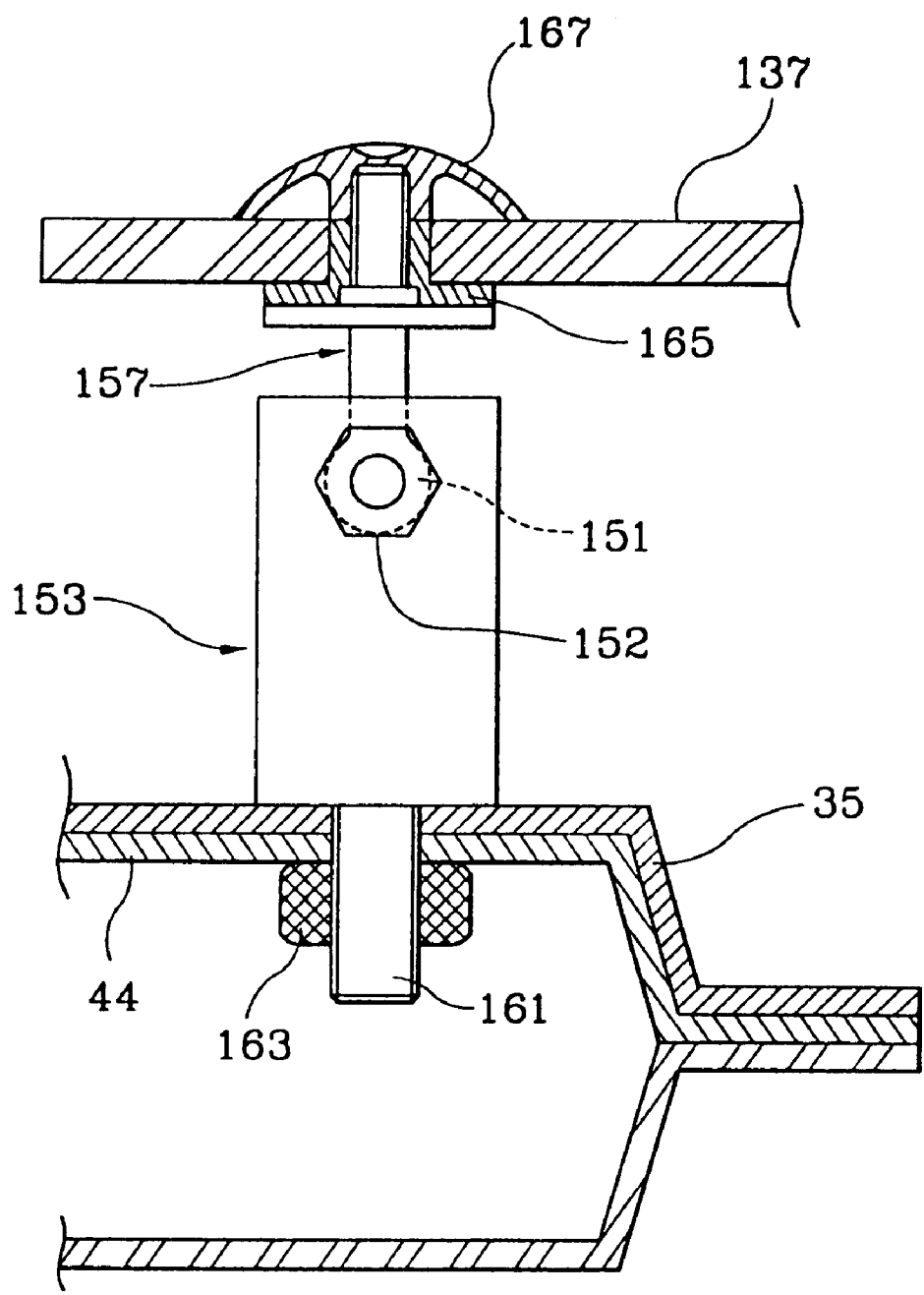
FIG. 7 is a detailed view of "C" part in FIG. 6.
Figure 8:
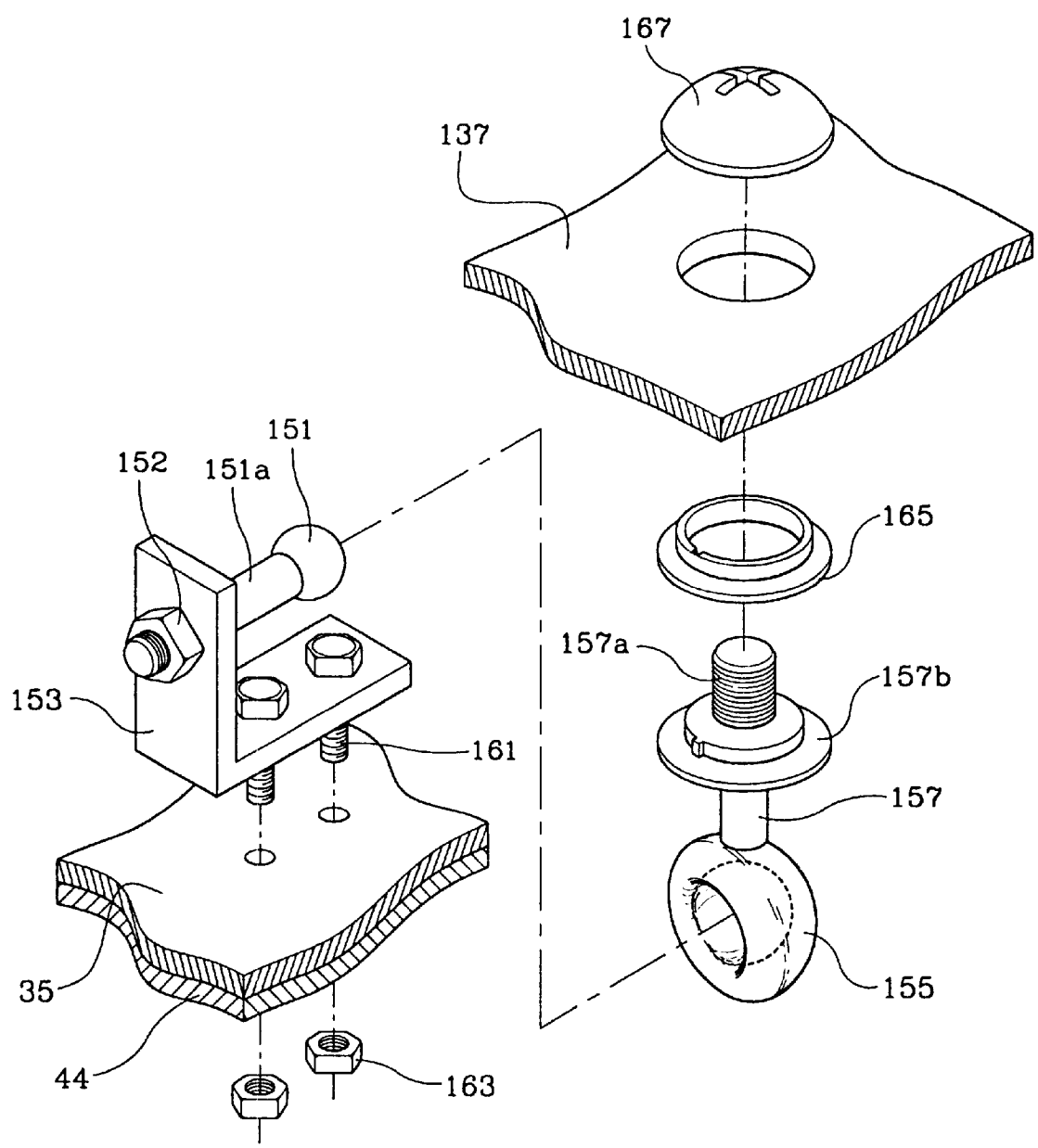
FIG. 8 is an exploded perspective view of FIG. 7.

FIGS. 6, 7 and 8 define a tailgate of a vehicle according to the second embodiment of the present invention.

Hinge means 150 for hinging a glass plate 137 according to the second embodiment of the present invention includes, as illustrated in FIGS. 7 and 8, a first mounting pivot 153 disposed at the tailgate outer panel and having a ball 151 and a second mounting pivot 157 disposed at the glass plate 137 and having a journal 155 surface-contacting the ball 151.

The first mounting pivot 153 has a structure where a right-angled bracket is coupled to the ball 151, and is coupled to the tailgate outer panel 35 by bolt 161 and nut 163. At this time, although the ball 151 is arranged with an extension unit 151a formed with a screw unit to be screwed to the right-angled bracket by a nut 152, it can be screwed without the extension unit or welded.

The ball 151 is provided at a vertical flange of bracket, and the bolt 161 and the nut 163 are coupled to a horizontal flange of the bracket. The tailgate outer panel 35 is extended therein by gasket 44 and coupled by a nut 163.

The second mounting pivot 157 is mounted thereunder with the journal unit 155 and the journal unit 155 is provided at an upper end thereof with a screw unit 157a. The screw unit 157a is formed thereunder with a flange 157b for the glass plate 137 to be inserted and hitched thereat.

The journal unit 155 is formed with a spherical hole, the shape of which is a little bit larger than a half sphere to prevent the ball from being easily detached therefrom and inserted thereinto. It is preferable to make the journal unit of a material having a predetermined force of resilience. The journal unit 155 only can be made of resilient material or the entire second mounting pivot 157 can be made of resilient material.

The screw unit 157a at the second mounting bracket 157 is inserted into a hole of the glass plate 137, which is then formed with a bush-type packing member 165 for protection of the glass. A cap-type nut 167 is inserted into the screw unit 157a to secure the second mounting bracket 157.

The first mounting bracket 153 equipped with the ball 151 is coupled to the tailgate outer panel 35 and the second mounting bracket 157 provided with the journal unit 155 is coupled to the glass plate, where the journal unit 155 is pushed into the ball 151 for simple assembly of the hinge means 150.

When the glass plate 137, formed at the tailgate of a vehicle according to the second embodiment of the present invention thus constructed, is lifted, the tailgate is lifted about the ball as indicated in an imaginary line in FIG. 6.

As apparent from the foregoing, there is an advantage in the tailgate of a car according to the present invention in that a glass plate is directly coupled to a tailgate outer panel by a first mounting bracket (or a first mounting pivot) and a second mounting bracket (or a second mounting pivot), such that structure is simple, part involved for assembly thereof are reduced and assembly is easy with manufacturing cost decreased and a beautiful exterior appearance.

What is claimed is:

1. A tailgate assembly for mounting on a car comprising:
   a tailgate inner panel and a tailgate outer panel, the inner and outer panels being joined to form a tailgate;
   a vertically openable and closable glass plate, the glass plate being directly coupled to an upper end of the outer tailgate panel by hinge means;
   the hinge means including:
      a first mounting bracket coupled to the tailgate outer panel;
      a second mounting bracket coupled to the glass plate, wherein a threaded portion of the second mounting bracket protrudes through the glass plate and is fixed to the glass plate by means of a packing member and a cap-nut; and
      a hinge axle for rotatably coupling the first and second mounting brackets.

2. A tailgate assembly for mounting on a car comprising:
   a tailgate inner panel and a tailgate outer panel, the inner and outer panels being joined to form a tailgate;
   a vertically openable and closable glass plate, the glass plate being directly coupled to an upper end of the outer tailgate panel by hinge means;
   the hinge means including:
      a first mounting pivot having a ball and coupled to the tailgate outer panel;
      a second mounting pivot having a journal surface contacting the ball; and
      a hinge axle for rotatably coupling the first and second mounting pivots.

3. A tailgate assembly for mounting on a car comprising:
   a tailgate inner panel and a tailgate outer panel, the inner and outer panels being joined to form a tailgate;
   a vertically openable and closable glass plate, the glass plate being directly coupled to an upper end of the outer tailgate panel by hinge means;
   the hinge means including:
      a first mounting pivot having a ball and coupled to the tailgate outer panel;
      a second mounting pivot having a journal surface contacting the ball and further including a threaded portion which protrudes through the glass plate and is fixed to the glass plate by means of a packing member and a cap-nut; and
      a hinge axle for rotatably coupling the first and second mounting pivots.

\* \* \* \* \*